P. HOLMES.
WIRE HAND REEL.
APPLICATION FILED MAY 24, 1912.
1,051,231.
Patented Jan. 21, 1913.
2 SHEETS—SHEET 1.
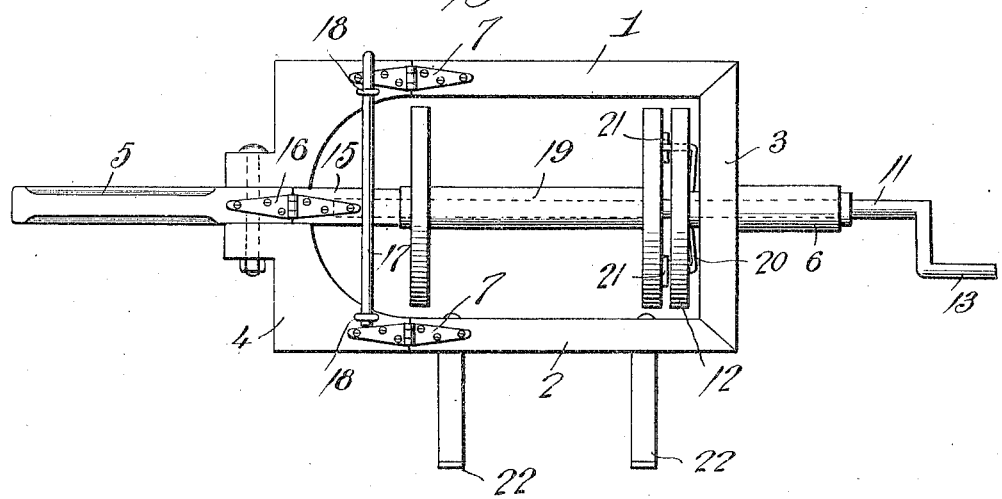
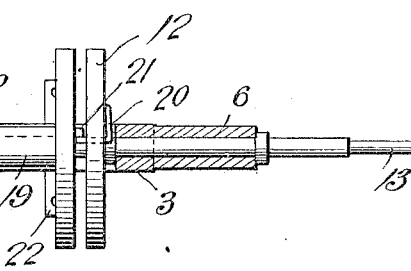
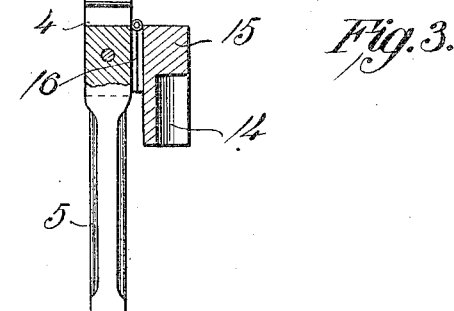
Witnesses
Inventor
*Pedro Holmes,*
By *Victor J. Evans*
Attorney

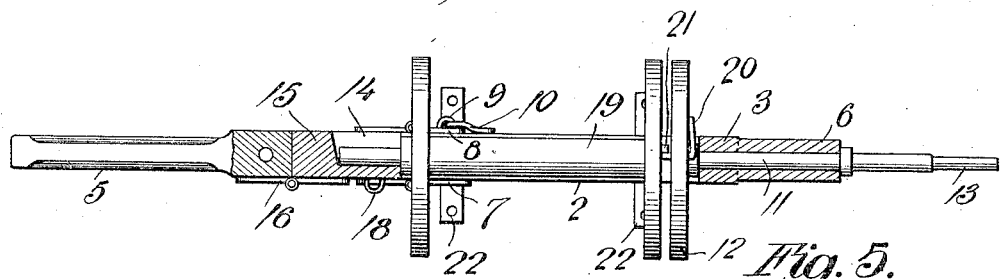
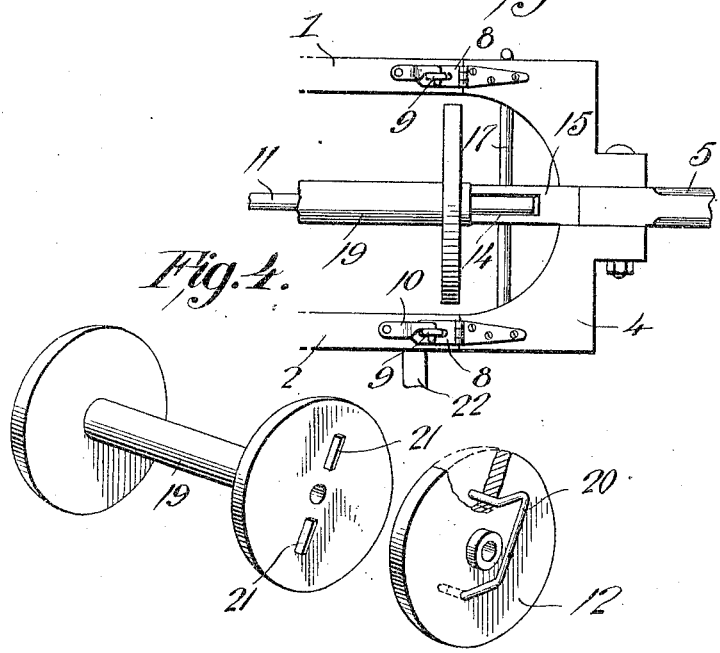

UNITED STATES PATENT OFFICE.

PEDRO HOLMES, OF TYLERTOWN, MISSISSIPPI.

WIRE HAND-REEL.

1,051,231.  Specification of Letters Patent.  Patented Jan. 21, 1913.

Application filed May 24, 1912. Serial No. 699,472.

*To all whom it may concern:*

Be it known that I, PEDRO HOLMES, a citizen of the United States, residing at Tylertown, in the county of Pike and State of Mississippi, have invented new and useful Improvements in Wire Hand-Reels, of which the following is a specification.

The invention has relation to means for reeling wire such as generally used for inclosing stock farms.

The invention contemplates a frame adapted to be carried over the field and a spool or drum removably mounted in the frame and adapted to have the wire to be reeled wound thereon, the latter operation being performed simultaneously with the transportation of the device over the field.

The invention relates most especially to the particular construction of the frame and to the mountings whereby the reel spool or drum is detachably mounted in the frame and whereby power may be applied to said spool for winding the wire to be reeled thereon.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a front view of a wire reeling device embodying the invention. Fig. 2 is a horizontal section of the frame, showing the spool or drum and the operating means therefor in full lines. Fig. 3 is a detail view, showing the relative position of the parts when the end piece of the frame is turned to admit of removing the spool or drum from the frame. Fig. 4 is a detail view, showing more clearly the means for connecting the spool or drum to the operating shaft. Fig. 5 is a reverse view of the end portion of the reel having the hinged bar.

Corresponding and like parts are referred to in the following description, and indicated in all the views of the drawings, by the same reference characters.

The frame of the device is of rectangular outline and comprises an upper bar 1, a lower bar 2, a fixed end bar 3 and a movable end bar 4. The bars 1, 2 and 3 may be connected in any convenient and substantial way. The bar 4 is connected to the bars 1 and 2 in any manner to admit of its turning so as to clear one end of the spool or drum to admit of the removal of the drum from the frame or the placing of the drum in position in the frame. A bar 5 is attached to the bar 4 and projects laterally therefrom and constitutes a handle. A bar 6 projects from the bar 3 and likewise constitutes a handle. When the device is in position for use the handle bars 5 and 6 extend in opposite directions and are adapted to be grasped each by an operator for transporting the device over the field, while at the same time the spool or drum is revolved to wind the wire thereon. The bar 4 is connected to the bars 1 and 2 by means of hinges 7. When the bar 4 is turned to throw the handle 5 in line with the handle 6 it is made secure by means of hasps 8 which are secured to the bar 4 and are adapted to engage staples 9 applied to the bars 1 and 2, a hook 10 passing through each of the staples 9 to hold the hasps 8 in fixed position.

A shaft 11 is mounted in the bars 3 and 6 and has a disk 12 secured thereto and is formed upon its outer end with a crank 13. The inner end of the shaft 11 enters a recess 14 formed in a side of an extension 15 connected to the inner end of the bar 5 by means of a hinge 16. When the parts are in line the extension 15 is made secure by means of a rod 17 which engages a side of the extension 15 and passes through staples 18 driven into opposite end portions of the bar 4. A spool or drum 19 is slipped upon the shaft 11 and is confined thereon between the pivoted extension 15 and the disk 12. Interlocking means are provided between the spool or drum 19 and the disk 12 to cause the two to rotate when the shaft 11 is turned by means of the crank 13. These interlocking means may be of any construction. A catch is provided on the disk 12 to engage a stop upon the outer side of the adjacent head of the spool. It is to be understood that there may be as many interlocking means as desired. As illustrated a U shaped wire 20 is secured to the outer side of the disk 12 and its end portions are bent substantially at a right angle and extend through openings formed in the disk 12 and project so as to engage stops 21 upon the adjacent end of the spool. The drum or spool is released by withdrawing the rod 17 from the staples 18 and disengaging the hooks 10 from the staples 9, thereby releasing the bar 4 and the extension 15 when said parts may be swung into position about as indicated in Fig. 3, so that the spool may be drawn from off the shaft 11 or slipped thereon as may be required. Brackets 22 are attached to the lower bar 2 and constitute supports for holding the device in upright position.

In practice after a spool has been placed in position in the frame two operators each grasping a handle bar carry the device over the field upon which the wire to be reeled is stretched. During the carrying of the device over the field one of the operators rotates the shaft 11 by means of the crank 13, thereby rotating the spool and winding the wire thereon. It is to be understood that the wire may be barbed, plain or of any variety such as commonly employed for inclosing stock raising farms or other places. The device provides convenient means for reeling the wire so that the same may be kept in proper shape for future use when required.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a device for reeling wire, the combination of a frame having an end bar hingedly connected thereto, a shaft mounted in the opposite end bar of the frame and adapted to receive a spool, a handle bar connected to the hinged end bar of the frame, an extension hinged to the inner end of said handle bar and having a recess in a side to receive the inner end of the before mentioned shaft, and means for securing the said extension when turned to aline with the handle bar or to lie in the plane of the hinged end bar.

2. In a device for reeling wire, the combination of a frame embodying a hinged end bar, handle bars applied to opposite end bars of the frame, a shaft journaled in the fixed end bar of the frame and in the handle bar attached thereto, a disk secured to said shaft, a spool mounted upon the shaft, interlocking means between the said disk and spool, an extension hinged to the inner end of the handle bar attached to the hinged end bar of the frame and adapted to engage the adjacent end of the spool and having a recess in a side to receive the inner end of the shaft, means for securing the hinged bar in the plane of the frame, and other means for securing the hinged extension of the handle bar when in the plane of the frame and in line with the handle bars.

In testimony whereof I affix my signature in presence of two witnesses.

PEDRO HOLMES.

Witnesses:
J. C. LASSER,
H. L. ANDERSON.

---

Copies of this patent may be obtained for five cents each, by addressing the "Commissioner of Patents, Washington, D. C."